June 1, 1948. R. M. WALLACE 2,442,446
METHOD AND APPARATUS FOR MAKING FINNED TUBING
Filed May 30, 1944 2 Sheets-Sheet 1
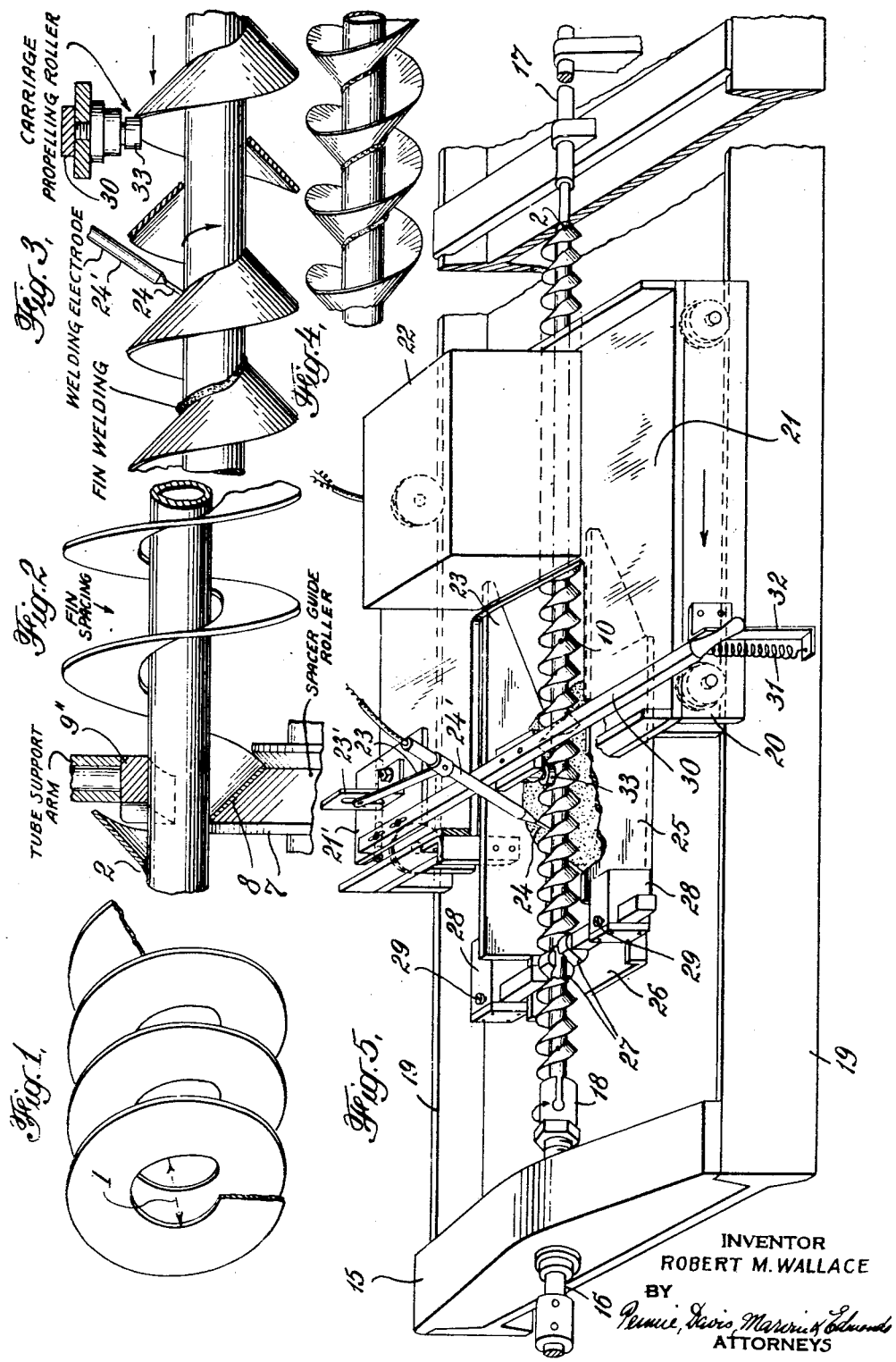
INVENTOR
ROBERT M. WALLACE
BY
ATTORNEYS

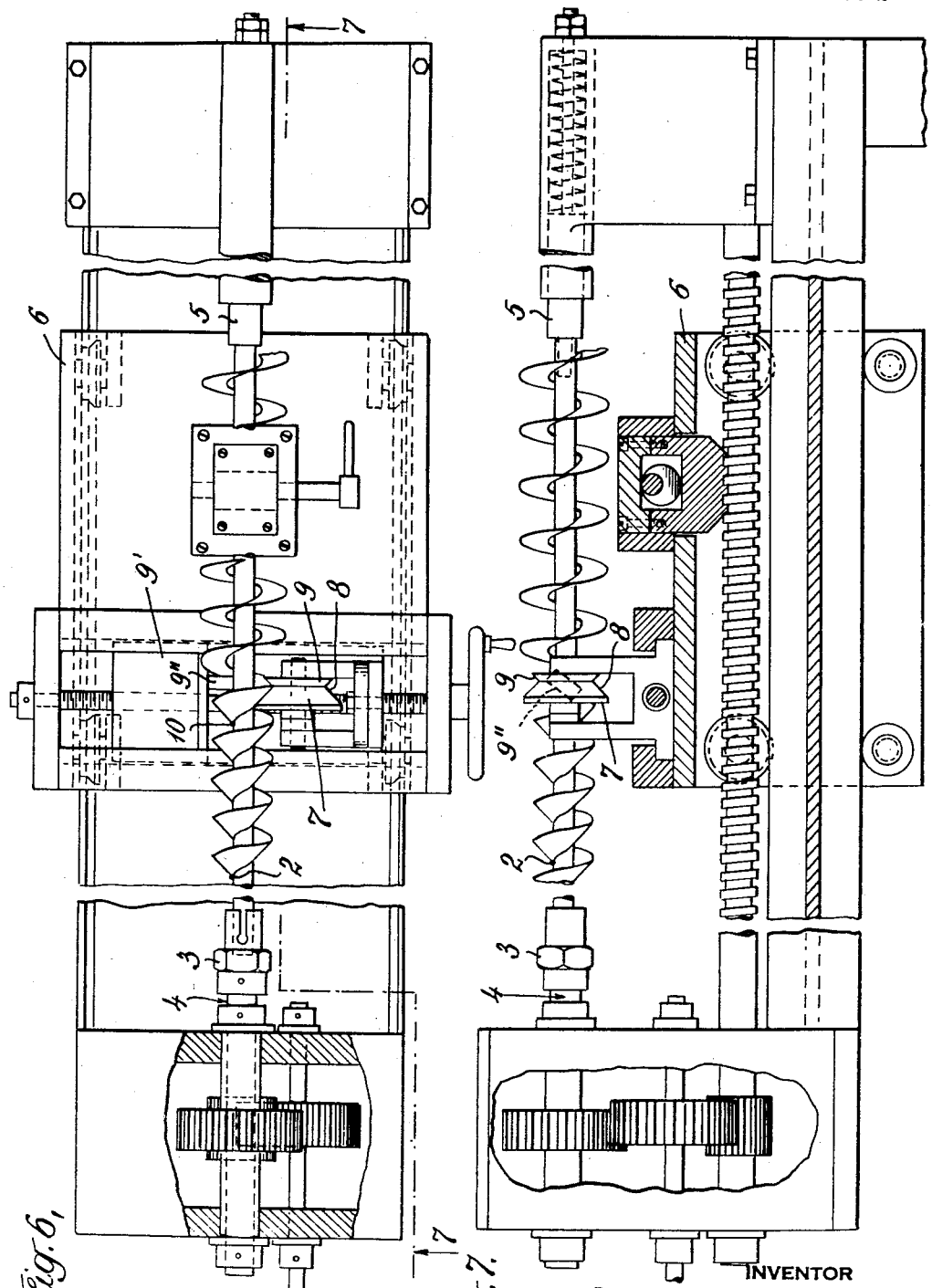

Patented June 1, 1948

2,442,446

UNITED STATES PATENT OFFICE 2,442,446

METHOD AND APPARATUS FOR MAKING FINNED TUBING

Robert M. Wallace, Massillon, Ohio, assignor to The Griscom-Russell Company, New York, N. Y., a corporation of Delaware Application May 30, 1944, Serial No. 538,053

3 Claims. (Cl. 29—157.3)

This invention relates to method and apparatus for making finned tubing and has for its object to provide a method and apparatus for expeditiously and cheaply manufacturing finned tubing for heat exchangers and other purposes wherein the fin consists of a continuous spiral rib with the plane of the rib that is, the plane in which the radial elements of the rib lie, at an angle to the axis of the tubing instead of being perpendicular thereto as is customary.

In the preferred embodiment of my invention the spirally wound fin is continuously welded at its base to the wall of the tubing, and one of the important features of my invention is the novel method and apparatus for rapidly and effectively welding the edge of the fin to the wall of the tubing. This portion of my invention may be readily employed in the manufacture of the ordinary heat exchanger tubing with the plane of the fins normal to the axis of the tubing.

Another important feature of my invention is the method and apparatus for winding and spacing of the fin on the tubing with the plane of the fin at an angle to the axis of the tubing. This feature may be employed without the welding step or in conjunction with other means of joining the fin to the tubing.

In the accompanying drawings I have illustrated the successive steps carried out in the practice of my improved method for the manufacture of the tubing of the type specified and have also illustrated certain novel features of the apparatus employed in carrying out such steps.

Referring to the drawings:

Fig. 1 shows the flat coiled fin ready for application to the tube;

Fig. 2 illustrates the procedure followed in spacing the fin along the wall of the tube;

Fig. 3 illustrates the method of welding the fin to the tube;

Fig. 4 is a perspective view of a short length of the finished tube;

Fig. 5 is a perspective view of the welding apparatus preferably employed for carrying out the step of Fig. 3;

Fig. 6 is a plan view of the fin winding apparatus; and

Fig. 7 is a vertical sectional view on line 7—7 of Fig. 6.

In carrying out my preferred method I pre-coil a strip of metal of the desired width and thickness in the form of a continuous flat helix, as illustrated in Fig. 1, for which purpose I may advantageously employ the coiling machine method disclosed in U. S. Patent No. 1,878,233 granted September 20, 1932 to Edward A. De-Wald. For forming finned heat exchanger tubes wherein the plane of the fin is normal to the axis of the tube, the inner diameter of the fin helix will be substantially the same as or but slightly greater than the outer diameter of the tubing so that the pre-coiled ribbon may be easily slipped over the tube. During the application of the fin to the tube to form finned tubing of this type, additional work is performed on the fin itself involving pulling it down to tightly grip the periphery of the tubing. The outer portion of the width of the fin is stretched by suitable guide rolls and knurling rolls of the fin winding head. When, however, the plane of the fin is to be inclined to the axis of the tubing, the inside diameter I of the flat helix is somewhat greater than the outer diameter of the tube so that when the fin helix is stretched along the tube to give the desired pitch to the fin, as indicated in Fig. 2, the inner edge of the coiled ribbon will contact the surface of the tube and the plane of the fin will be deflected from the normal to whatever extent is desired. In this specification and the appended claims, the plane of the fin or strip is employed to denote a plane extending transversely of the tube and tangent to the fin strip along a radial element thereof. The relation between the inside diameter of the fin helix and the outside diameter of the tube has a direct relationship to the pitch of the fin and the angle of deflection thereof. No additional work is performed on the fin proper while it is spaced along the tube to form an inclined plane fin structure.

After the flat coiled helix is slipped over the tube, the end of the fin at the left as shown in Fig. 6 is pulled out along the wall of the tubing, forming a space between the first turn of the helix and the next adjacent turn of a width to give the desired pitch to the fin. As the fin is so pulled out the plane of the fin will be inclined to the perpendicular to an extent depending upon the internal diameter of the helix and external diameter of the tube.

The leading end of the fin is spot-welded to the tube as indicated at 2 and the adjacent end of the tube is clamped in the chuck 3 on the end of a rotating shaft 4. The other end of the tube is supported for rotation on a bearing 5 mounted at the opposite end of the machine frame. The machine is also provided with a traveling bed 6 underlying the tube and on which is supported a spacer guide roller 7 whose working or fin-engaging face or part 8 includes a straight element extending radially of the tube and inclined to its axis of rotation of the extent to which the plane of the fin is to be inclined to the axis of the tube. The small end of the face 8 of the roller 7 is provided with an annular shoulder 9 disposed at an angle to said face which engages the outer edge of the fin and so forces the fin to the desired angular position in contact with the inclined face 8. The machine bed also carries a block 9' carrying a tube supporting arm 9" engaging the tube surface opposite the guide roller 7 to hold the tube against lateral displacement from the pressure exerted by the guide roller against the fin.

The movement of the machine bed is correlated with the rotation of the shaft 4 to give the desired pitch to the spiral fin and as the operation proceeds, the spacer guide roller 7 stretches the coils of the fin lengthwise of the tube to the desired pitch and wraps the fin tightly around the tube. At intervals as the winding proceeds, a spot weld, as indicated at 10, is made to hold the fin against displacement on the tube until the final welding is accomplished.

After the fin has been wound and spot welded to the tube as indicated, it is permanently attached to the tube by a continuous weld at the junction between the base of the fin and the contiguous tube surface, as indicated at 11 in Fig. 3. To accomplish this welding operation expeditiously and accurately, I preferably employ a machine of the design illustrated in Fig. 5. This machine consists of a frame 15 having a power-driven spindle 16 at one end and an aligned rotary bearing 17 at the other end for supporting and rotating the tube. The tube is connected to the shaft 16 by a chuck 18 whereby the tube with the fin spot welded to it at intervals may be continuously rotated. The supporting carriage 15 has rails 19 at each side which are parallel to the tube supporting shafts 16 and 17, and mounted for travel on the rails 19 is a carriage 20 which carries the welding mechanism.

The floor 21 of the carriage 20 overlies the tube and its attached fin and carries a welding control box conventionally indicated at 22. Secured to the floor 21 through a hinged plate 21' and a bracket 23' is a support 23 for the welding electrode 24 which is carried by a contactor nozzle 24' so secured to the support 23 that the electrode projects downwardly at an angle of approximately 90% to the inclined fin on the tube beneath it.

An arm 30 is fixed at one end to a plate 21' hingedly secured to the carriage 20 and the arm extends transversely of the carriage floor 21 and is removably held down in contact with the floor by a spring 31 connected between the arm 30 and a bracket 32. A roller 33 is rotatably supported to depend from the under surface of the arm 30 in line with the tube, and is so disposed as to bear along the outer edge of the fin on the tube. As the tube is rotated, the fin acts as a screw to propel the carriage 21 along the rails 19 lengthwise of the tube from the end of the tube adjacent the bearing 17 to the end thereof adjacent the chuck 18. During this movement of the carriage 21, the electrode 24 is guided to its proper welding position adjacent but slightly spaced from the line of juncture between the fin and the tube. The electrode is disposed within one or two fin turns of the roller 33 so that irregularities in the pitch of the fin along the length of the tube do not materially alter the position of the electrode relative to the line of juncture to be welded.

The weld between the fin and the tube may be formed by any known welding process, and in the disclosed embodiment, is formed by the submerged arc process in which the electrode is consumable and the arc between the electrode and the work is submerged in molten flux melted by the heat of the arc from a quantity of powdered flux filling and surrounding the space between the work and the electrode. This submerged arc process is termed the "Union Melt" process by one manufacturer, and the flux employed in this process is conventionally termed the melt.

In order to supply the melt for the weld, a trough 25 is suspended from the under side of the floor 21, the floor 26 of the trough underlying the tube and its attached fin. The trough is partially filled with the melt in powdered form so that as the tube rotates, the end of the electrode properly guided to its correct position closely adjacent the line of juncture between the fin and the tube is surrounded by the melt. Additional melt is supplied to the trough 25 from time to time as required. A welded seam is thus formed in the triangular space between the edge of the fin and the adjacent tube wall as illustrated at 11 in Fig. 3.

To maintain the electrode 24 accurately aligned with the axis of the tube during the movement of the carriage, the trough 25 is provided adjacent the forward end with guide jaws 27 which are shaped to fit the wall of the tube between two adjacent turns of the fin. The jaws 27 are mounted for movement toward and away from the tube in any suitable manner, for example, as shown in Fig. 5, the bars carrying the jaws 27 may be mounted in guides 28 and held in adjusted position against the tube by set screws 29.

While the operation of welding the fins to the tube may be accomplished accurately and expeditiously with the apparatus disclosed, it will of course be understood that the welding may be accomplished by hand or with other types of welding apparatus.

It will be noted that the edge surface of the coiled fin is substantially at right angles to the face of the fin and consequently when the face of the fin is inclined to the normal in the manner shown, the edge of the fin will also be inclined, thus forming a substantially triangular shaped groove between the edge of the fin and the adjacent wall of the tube which receives the molten welding metal and forms a strong welded joint, affording a perfect heat-conducting connection between the metal of the tube and the metal of the fin.

The finned tube of the present invention forms an excellent heat-radiating element with a greater heat-radiating surface for the same overall diameter of tube than obtainable with the conventional spiral fin tubing wherein the fin is perpendicular to the axis of the tubing.

The tubing is also particularly useful in heat exchangers for extracting heat from granular or pulverulent materials such, for example, as the solid catalyst materials employed in certain oil cracking operations. The inclined fin facilitates the flow of the solid material over the heat exchange surface of the fins and if the tubes are mounted with the edges of the fins extending downwardly the pulverulent material will flow through the shell around the tubes in substantially uniform manner without clogging or forming pockets. When the fin is normal to the axis of the tube the pitch of the fin must be very steep in order to prevent the pulverulent material accumulating in the spaces between the fins and checking the flow of the material. With the inclined fin of the new type of tubing the pitch of the spiral is not relied upon to effect the downward flow of the material but merely the inclination of the fin with respect to the axis of the tubing, and consequently a closely wound fin of comparatively flat pitch may be employed, thus greatly increasing the available heat-conducting surface.

While I have shown the fin as joined to the tubing by a continuous welded seam, it is obvious that the steps of coiling the fin and spacing the fin on the tube with its axis inclined to the horizontal may be employed with other types of heat-conducting bonds between the fin and the tubing. For example, the surface of the tube may be knurled or serrated as shown in U. S. Patent No. 1,992,297 and the fin wound against the tube under sufficient pressure to form between the fin and the tubing a type of joint such as disclosed in said patent with reference to the conventional radial fin. Also the tube may be grooved for the reception of the inner edge of the fin and the metal of the tube along the edge of the groove pressed against the fin to form a heat-conducting joint.

It will also be understood that the method and apparatus disclosed for welding the edge of the fin to the tubing may be employed in making conventional tubing with the plane of the fin normal to the axis of the tubing. For such purpose no modification of the apparatus disclosed will be required except the proper shaping of the electrode holder and the spacer guide roller to conform with the conventional radial fin.

Other changes in the procedure and apparatus may obviously be made within the scope of the appended claims.

I claim:

1. The method of applying a heat radiating fin to a tube which comprises coiling a strip of metal into a flat closely coiled helix having an internal diameter greater than the outside diameter of the tube, extending the tube into the coil, attaching one turn of the coil adjacent one end thereof to the wall of the tube, inserting between two adjacent turns of said coil a spacing roller having a straight element disposed at an acute angle to the axis of the tube and a peripheral part disposed at an angle to said straight element, contacting said roller element and part respectively with the face and the outer edge of the coiled strip and effecting relative rotation and longitudinal movement of the tube and the spacing roller to extend the coiled strip along the tube and simultaneously contract the internal diameter of the coiled strip sufficiently to contact its inner edge with the wall of the tube and turn the plane of the strip to an acute angle to the axis of the tube.

2. Apparatus for spacing a pre-coiled, flat, radially-extending fin on a tube comprising means for rotating the tube, a support movable longitudinally of the tube and in parallelism therewith, means for shifting said support longitudinally of the tube in timed relation with the rotation of the tube, and a spacer member carried by said traveling support having only two fin-engaging and confining surfaces, one including a straight fin-face-engaging element extending radially of the tube at an acute angle to the tube axis, and the other including a part disposed at such an angle to said fin-face-engaging element as to adapt it to engage and confine a substantial portion of the outer edge surface of a fin when a fin face is engaged by said other surface, said spacer member serving to space the successive turns of a fin longitudinally of the tube and to bend the plane of a fin toward the tube at an acute angle to the axis of the tube.

3. Apparatus for spacing a pre-coiled, flat, radially-extending fin on a tube comprising means for rotating the tube, a support movable longitudinally of the tube and in parallelism therewith, means for shifting said support longitudinally of the tube in timed relation with the rotation of the tube and a spacing roller carried by said traveling support and having only two fin-engaging and confining surfaces, one including a straight fin-face-engaging element disposed at an acute angle to the tube axis and the other being a peripheral shoulder disposed at such an angle to said fin-face-engaging element as to adapt it to engage and confine a substantial portion of the outer edge surface of a fin when a fin face is engaged by said other surface, said fin-engaging and confining surfaces acting to space the successive turns of a fin longitudinally of the tube and to bend the plane of a fin toward the tube at an acute angle to the axis of the tube.

ROBERT M. WALLACE.

REFERENCES CITED

The following references are of record in the file of this patent:

UNITED STATES PATENTS

| Number | Name | Date |
|---|---|---|
| 1,151,721 | Sahlin | Aug. 31, 1915 |
| 1,217,537 | Turney | Feb. 27, 1917 |
| 1,738,994 | Gredell | Dec. 10, 1929 |
| 1,837,294 | Scheid | Dec. 22, 1931 |
| 1,909,704 | Morseth | May 16, 1933 |
| 1,950,623 | Owston | Mar. 13, 1934 |
| 1,981,566 | Nigro | Nov. 20, 1934 |
| 1,992,296 | DeWald | Feb. 26, 1935 |
| 2,039,690 | Trainer | May 5, 1936 |
| 2,155,394 | Berg | Apr. 25, 1939 |
| 2,179,881 | Du Boscq De Beaumont | Nov. 14, 1939 |
| 2,226,535 | Payne | Dec. 31, 1940 |

FOREIGN PATENTS

| Number | Country | Date |
|---|---|---|
| 618,099 | Germany | Aug. 31, 1935 |